United States Patent [19]

Yrjönen et al.

[11] Patent Number: 5,278,415
[45] Date of Patent: Jan. 11, 1994

[54] METHOD OF PRODUCING STANDARDIZATION SAMPLES FOR LIQUID SCINTILLATION COUNTING QUENCH CURVE AND A FOIL

[76] Inventors: Tapio Yrjönen, Lauklähteenkatu 7 J 85, SF-20740 Turku; Raimo Harju, Jaanintie 34 D 73, 20540 Turku, both of Finland

[21] Appl. No.: 948,604
[22] Filed: Sep. 23, 1992
[51] Int. Cl.⁵ .............................................. G01T 1/204
[52] U.S. Cl. ..................................... 250/362; 250/364
[58] Field of Search ........................ 250/362, 364, 328

[56] References Cited

U.S. PATENT DOCUMENTS 3,688,120  8/1972  Packard .................. 250/328
4,933,554  6/1990  Lehtinen et al. .......... 250/328

Primary Examiner—Paul M. Dzierzynski
Assistant Examiner—Richard Hanig
Attorney, Agent, or Firm—Shea & Gould

[57] ABSTRACT

A method for producing standardization samples (11, 21) for obtaining the quench curve which describes the relationship between the counting efficiency and the amount of the quench of the sample is described. According to this method the different quench levels of the standardization samples are performed by covering different standardization samples with scintillation photons permeable foils (12, 13, 14, 25) having variable amounts of black dots (22, 23, 24), which absorb of produced scintillation photons.

9 Claims, 1 Drawing Sheet

METHOD OF PRODUCING STANDARDIZATION SAMPLES FOR LIQUID SCINTILLATION COUNTING QUENCH CURVE AND A FOIL

BACKGROUND OF THE INVENTION

Liquid scintillation counters are commonly used to measure the count rate or activity of samples containing low energy beta particles or corresponding particles emitting radionuclides such as tritium, iodine-125, carbon-14, sulphur-35, calcium-40 and chromium-51.

The range of the low energy beta particles in the sample is in generally few tens of micrometers at the most. As a consequence, the sample to be measured has to be placed in direct contact with a scintillation medium by dissolving or suspending the sample within the liquid scintillation medium in a container so that the emitted beta particles can interact with the molecules of the liquid scintillation medium, which comprises a solvent or solvents and a solute or solutes present in a few percent by weight of the solution. In this interaction process most of the kinetic energy of the interacted beta particle is absorbed by the solvent and then transferred to the solute which emits scintillation photons, whose amount is proportional to the energy of the interacted beta particle. These scintillation photons are detected by two, in coincidence operating, photomultiplier tubes producing electric pulses. The sum pulse height is proportional to the energy of the interacted beta particle.

Traditional liquid scintillation counters are provided with one detector and they are designed to measure samples in 7 ml or 20 ml glass or plastic vials.

In addition to the above mentioned conventional liquid scintillation counters three special purpose liquid scintillation counters exist, which counts samples directly from filter mats or multi-well sample plates.

First special purpose liquid scintillation counter is shown in U.S. Pat. No. 4,298,796, which apparatus counts liquid scintillation or corresponding samples directly from support layer, which is disposed within a container which contains the liquid or gel scintillant. The apparatus has one or several detectors in order to count one or several samples at a time.

Second special purpose liquid scintallation counter is shown in U.S. Pat. No. 5,061,853, which apparatus counts liquid scintillation or corresponding samples directly from sample plates which comprises several separate sample wells or vials. The apparatus has one or several detectors in order to count one or several samples at a time. The sample plate is placed in the counting position or before counting position manually or automatically on a rigid plate holder made of photon attenuating material and having holes for the wells of the sample plate. The walls of the holes are reflecting or scattering in order to guide the photons from the liquid scintillation sample to the detectors, built of two photomultiplier tubes operating in coincidence and situated on the opposite sides of the holes of the plate holder. The wells of the sample plate can be closed by an adhesive transparent tape. The apparatus can be used also for counting gamma radiation emitting samples if the holes of the sample plate are surrounded by gamma radiation sensitive detectors.

Third special purpose scintillation counting system for in-situ measurement of radioactive samples in a multiple-well plate is presented under European Patent Publication Number 0425767 A1. This apparatus is provided with multiple photomultiplier tubes positioned adjacent to the sample wells containing the scintillator for simultaneously measuring the radioactivity of multiple samples with only a single photomultiplier tube sensing the scintillations from each well and converting the sensed scintillations into corresponding electrical pulses. The electrical pulses from each photomultiplier tube are processed to discriminate between pulses attributable to sample events within the wells and pulses attributable to non-sample events such as photomultiplier tube noise. The discrimination is effected by determining whether a selected number of electrical pulses occurs with a prescribed time interval, the occurrence of the selected number of pulses within the prescribed time interval signifying a sample event. Only the electrical pulses attributable to sample events are supplied to a pulse analyzer.

The multi-well sample plates have typically eight rows of wells, whose diameter is 7-8 mm arranged in twelve columns with 9 millimeters distance between the center points of the wells. The typical volumes of sample wells of such 96-well sample plates are 200-400 microliters depending on the height of the plate.

When measuring sample activities with liquid scintillation counters, the basic problem is the reduction of the counting efficiency due to the quenching of the sample, which can be classifield in two main types: the chemical quench and the color quench. The chemical quench is a phenomenom, where the solution formed by the sample and the scintillation medium contains some impurities, which reduce the efficiency of the counting system to detect the emitted beta particles by absorbing them. The color quench is a phenomenom, where the solution formed by the sample and the scintillation medium contains some impurities, which absorb produced scintillation phtotons. The consequence of this is also the reduction of the counting efficiency.

It is known in the liquid scintillation counting that the reduction of the counting efficiency due to the quenching of the sample can be corrected by a means of a quench curve which describes the relationship between the counting efficiency and the amount of the quench of the sample. The quench curve is obtained by measuring a set of standards, which have same activity but different amount of quench. Standards are prepared for example in the following way:

1) 10 ml scintillation liquid is pipetted into 20 ml sample vials. Normally 5-10 vials are used.
2) A constant amount of activity of used isotope is added into each vials. The vials are shaken well and the solution is often allowed to stand overnight.
3) The standard solution samples in vials are quenched by adding an amount of quencher, for example carbontetrachloride (CCl-4) which is a chemical quencher, into the vials, a different volume into each vial. Instead of a chemical quencher a color quencher, for example appropriate color dye, can be used. Carbontetrachloride is added for example as follows:

| Vial No | CCl-4 (microliters) |
| --- | --- |
| 1 | 0 |
| 2 | 5 |
| 3 | 10 |
| 4 | 15 |
| 5 | 30 |
| 6 | 50 |
| 7 | 70 |
| 8 | 90 |

| Vial No | CCl-4 (microliters) |
| --- | --- |
| 9 | 120 |
| 10 | 150 |

If samples to be analyzed are deposited and counted directly from sample plates which comprises several separate sample wells or vials, then preparation of the standards continues as follows:

4) From each of the standard vials for example 200 microliters of quench standard solution is pipetted into the appropriate wells on the sample plate.

In U.S. Pat. No. 4,933,554 (Lehtinen, Yrjönen, Östrup) is shown a method of producing a carrier for a plurality of radioactive sample to be monitored in a liquid scintillation counter. According to this method sample plate is sealed with two photon permeable adhesive foils and at least one of the foils can be colored in order to simulate quenching. Due to the expensiveness of producing colored foils with exactly variable optical densities and spectra, the present invention shows a more reliable and simplier method, where standardization samples are quenched by covering them with photon permeable foils, which are provided with small separate black dots arranged in matrix form. Those scintillation photons produced by sample which hit these black dots are absorbed. Thus quenching of the sample depends on the relative total area of the black dots on the foil.

SUMMARY OF THE INVENTION

The present invention shows a new method for producing standardization samples for obtaining the quench curve which describes the relationship between the counting efficiency and the amount of the quench of the sample. According to this method the different quench levels of the standardization samples are performed by covering different standardization samples with scintiillation photons permeable foils provided with small separate black dots arranged in a matrix form. The different quench levels are obtained by applying different relative total area of the black dots on the foil.

DESCRIPTION OF THE PREFERRED EMBODIMENTS

Figure 1:
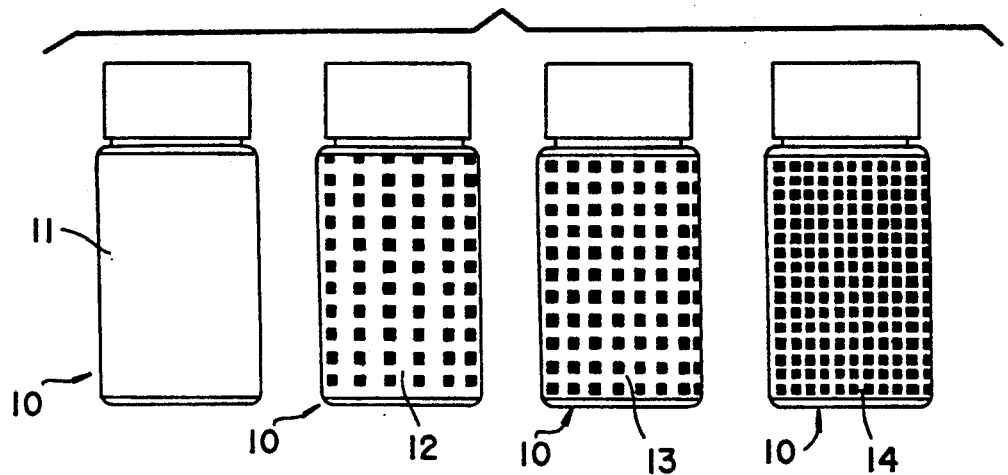
FIG. 1 shows a set of standardization sample vials covered with scintillation photons permeable foils comprising different amount of black dots, which absorb produced scintillation photons.

Four sample vials 10 are illustrated in FIG. 1. Each vial is containing a sample 11 with a constant amount of activity of used isotope. The first vial is uncovered. The second vial is covered with a scintillation photon permeable foil 12, the third vial is covered a scintillation photon permeable foil 13 and the fourth vial is covered with a scintillation photon permeable foil 14. Said foils 12, 13 and 14 are provided with increasing amount of black dots, which absorb produced scintillation photons. As a consequence of this these samples can be used for obtaining a quench curve which describes the relationship between the counting efficiency and the amount of quench of the sample.

Figure 2:
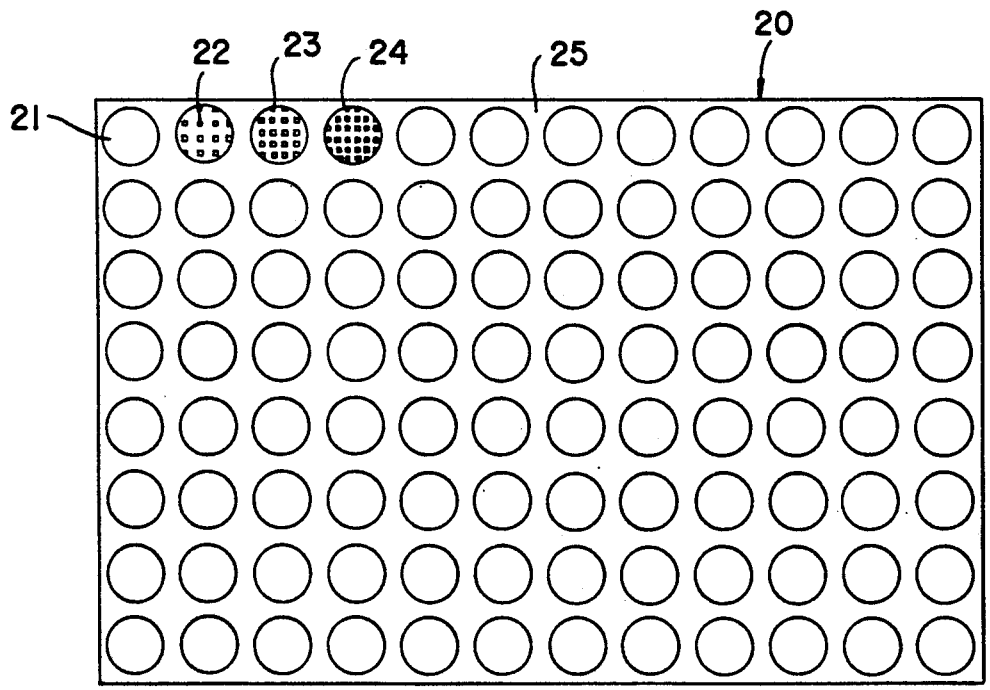
FIG. 2 shows a multi-well sample plate covered by a scintillation photons permeable foil, which provides the different standardization samples deposited on the multi-well sample plate with different amount of black dots, which absorb produced scintillation photons.

FIG. 2 shows a top view of a multi-well sample plate 20 provided with four samples 21 with a constant amount of activity of used isotope. One or the both surfaces of the plate 20 are covered with a scintillation photon permeable foil 25, which covers said samples with increasing amount of scintillation photons absorbing black dots 22, 23, 24. As a consequence of this these samples can be used for obtaining a quench curve which describes the relationship between the counting efficiency and the amount of quench of the sample.

The dots in the foils 12, 13 and 14 of FIG. 1 and the dots 22, 23, 24 in FIG. 2 are presented exaggerated to make the principal clearer. In reality the dots can not be seen as much separately as seen in FIG. 1 and in FIG. 2. The dots rather form a screen that can be seen lighter or darker depending of the relative total area of the black dots on the foil.

The above said dots are black but they can be any colour which absorb produced scintillation photons. For the liquid scintillation counters used by the applicant the dots can also be yellow.

The method of producing standardization samples for liquid scintillation counting quench curve according to the present invention is not confined to above description alone, but it may show even considerable variation within the scope of patent claims.

We claim:

1. A method of producing standardization samples (11, 21) for liquid scintillation counting quench curve, characterized by covering at least one standardization sample (11, 21) with a scintillation photon permeable foil (12, 13, 14, 25) comprising dots (22, 23, 24) which absorb scintillation photons produced by said standardization sample.

2. A method according to method of claim 1 characterized by covering at least one standardization sample (11, 21) with a foil (12, 13, 14, 25) comprising inpermeable dots (22, 23, 24) preferably black or yellow or any colour which absorb scintillation photons produced by said standardization sample.

3. A method according to method of claim 1 characterized by determining the quenching ratio by the relative total area of the inpermeable black dots (22, 23, 24) on the foil (12, 13, 14, 25).

4. A method according to method of claim 1 characterized by determining the quenching ratio by the size of the inpermeable black dots (22, 23, 24) on the foil (12, 13, 14, 25).

5. A method according to method of claim 1 characterized by determining the quenching ratio by the form of the inpermeable black dots (22, 23, 24) on the foil (12, 13, 14, 25).

6. A foil for covering a standardization sample (11, 21) characterized in that the foil (12, 13, 14, 25) is a scintillation photon permeable foil With dots (22, 23, 24) which absorb scintillation photons produced by said standardization sample.

7. A foil according to claim 6 characterized in that the foil (12, 13, 14) has the same relative amount of the inpermeable dots (22, 23, 24) preferably black or yellow or any colour which absorb scintillation photons in every part of the foil.

8. A foil according to claim 6 characterized in that the foil (25) has different parts where the relative amounts of the inpermeable dots (22, 23, 24) are different.

9. A foil (25) according to claim 6 characterized in that the foil is a sticker, pressure sensitive film or heat sealable film, which seals the vials (10).

* * * * *